2,820,830

PRODUCTION OF ORGANIC BORON HALIDES

Patrick A. McCusker, South Bend, Ind., assignor, by mesne assignments, to Olin Chemical Co., Inc., a corporation of Delaware No Drawing. Application March 5, 1954
Serial No. 414,495

9 Claims. (Cl. 260—606.5)

My invention relates to a new process for the preparation of certain organohaloborines by the reaction of boron halides on organoboronic acids or organoborinic acids.

Thus, in accordance with my invention, I have found that the direct reaction of boron halides, including boron trifluoride, boron trichloride and boron tribromide, with organoboronic acids in which the organic substituent is a saturated or aromatic hydrocarbon radical results in the production of the corresponding organodihaloborines in accordance with the equation:

$$3RB(OH)_2 + 5BX_3 \rightarrow 3RBX_2 + B_2O_3 + 3BX_3 \cdot H_2O$$

wherein R is a saturated or aromatic hydrocarbon radical and wherein X is fluorine, chlorine or bromine. Likewise, I have found that the direct reaction of certain boron halides, such as boron trifluoride, boron trichloride and boron tribromide, and organoborinic acids in which the organic substituents are saturated or aromatic hydrocarbon radicals results in the production of the corresponding organohaloborines in accordance with the equation:

$$6R_2B(OH) + 5BX_3 \rightarrow 6R_2BX + B_2O_3 + 3BX_3 \cdot H_2O$$

wherein R and X have the significance previously indicated.

Thus, my invention provides a means whereby the aforementioned boron halides can be reacted with compounds of the formula $R_nB(OH)_{3-n}$ to provide compounds of the formula $R_nBX_{3-n}$ in accordance with the equation:

$$3nR_nB(OH)_{3-n} + 5BX_3 \rightarrow 3nR_nBX_{3-n} + B_2O_3 + 3BX_3 \cdot H_2O$$

R and X having the significance already given and $n$ being an integer from 1 to 2. When R is an aromatic hydrocarbon radical, however, such as phenyl, X should not be fluorine in any of the three above equations.

The method which I have devised is one which is easily performed and is one in which the water formed is easily removed. The method provides a means whereby various heretofore known compounds can be easily prepared and it also provides a method for the production of a wide variety of new compounds. The compounds produced when my method is practiced can be used for a wide variety of purposes in the chemical arts, since they are reactive intermediates for the preparation of other organoboron compounds, are selective catalysts of the Lewis acid type and are smoke-producing materials. Other uses for the compounds produced in accordance with the method of my invention will suggest themselves to those skilled in the art.

The following examples illustrate in detail the preparation of various organohaloborine compounds in accordance with my process and are to be considered as not limitative.

Example I

A 500 ml., 3-neck round bottom flask was fitted with an inlet tube extending to the bottom of the flask; a mercury-sealed stirrer; and a distilling head which was fitted with a thermometer; a water-cooled condenser to which was attached a vacuum adapter; and a 200 ml. receiver. Boron trifluoride was passed through a Gilman bridge containing concentrated sulfuric acid and through the inlet tube. The exit gases flowed through the outlet in the adapter into a trap, cooled by an acetone-Dry Ice mixture, and finally through a second Gilman bridge containing concentrated sulfuric acid.

Crude n-amylboronic acid (120 g.; 1.03 moles) prepared in the manner described by Snyder, Kuck and Johnson, J. Am. Chem. Soc. 60, 105 (1938) was placed in the reaction flask which had been previously flushed out with boron trifluoride. When boron trifluoride was passed into the reaction flask, the solid liquefied and the liquid separated into two layers. The stirrer was started and the addition of boron trifluoride was continued until the absorption of boron trifluoride slowed down, as indicated by the presence of exit gases. The liquid in the reaction flask was then transferred into a 250 ml. separatory funnel and the two layers separated. The upper layer was replaced in the reaction flask. The stirrer was again started and more boron trifluoride was slowly passed through the apparatus while the reaction mixture was heated to boiling with a heating mantle. Distillate was collected up to a head temperature of 63° C. The reaction flask was then cooled and the residue solidified. The distillate was redistilled through a glass helix packed column and the fraction (50.6 g.; 0.42 mole) boiling at 62–65.5° C. was collected.

The n-amyldifluoroborine was purified by fractional distillation in a nitrogen atmosphere through a 22-inch glass helix packed column at a reflux ratio of about 7:1. The distillation apparatus was protected from atmospheric moisture by a Gilman bridge containing concentrated sulfuric acid. The pure n-amyldifluoroborine boiled at 65.2–65.7° C. and was a colorless mobile liquid which fumed very strongly in air to form a white smoke. It absorbed moisture from the air rapidly giving n-amylboronic acid as a hydrolysis product.

Example II

A 50 ml. round bottom flask was fitted with a two hole rubber stopper, fitted with an inlet tube which extended to the bottom of the flask, and an outlet tube which was connected to a trap, cooled by an acetone-Dry Ice mixture. One Gilman bridge containing concentrated sulfuric acid was attached to the inlet tube for the boron trifluoride entering the apparatus and another was attached to the trap for the exit gases to pass through.

The system was flushed out with boron trifluoride and 9.0 g. (0.088 mole) of pure dry n-butyl boronic acid prepared in the manner described by Snyder, Kuck and Johnson, J. Am. Chem. Soc. 60, 105 (1938) was placed in the reaction flask. When boron trifluoride was passed into the system, the solid n-butylboronic acid liquefied with the liberation of heat and separated into two layers. The n-butyldifluoroborine was distilled by the heat of the reaction into the trap. A semi-solid residue remained. The crude product weighed 4.7 g. Yield: 0.045 mole; 51%.

The n-butyldifluoroborine was distilled from a 10 ml. distilling flask into a small water cooled receiver. The liquid boiled at 36–37° C.

Example III

A 200 ml. round bottom flask was fitted with a simple distilling head, water cooled condenser, vacuum adapter and receiver. The head thermometer was replaced by a glass addition tube which extended to the bottom of the reaction flask. A cylinder of boron trifluoride was connected to a sulfuric acid bubbling bottle which was attached to the addition tube. The exit gases passed through the outlet in the adapter into an acetone-Dry Ice trap and finally through a sulfuric acid bubbling bottle.

Boron trifluoride was passed through the apparatus to flush out the air. n-Hexylboronic acid (41 g.; 0.31 mole) prepared in the manner described by Snyder, Kuck and Johnson, J. Am. Chem. Soc. 60, 105 (1938) was placed in the reaction flask and boron trifluoride was passed through the system. Reaction took place immediately to give two liquid layers with the liberation of heat. The addition of boron trifluoride was continued until absorption of boron trifluoride slowed down as was indicated by the appearance of exit gases. The addition was then stopped and the two layers were separated.

The upper layer was distilled through a Vigreaux column and the material boiling below 95° C. was collected. The residual liquid (about 20 ml.) was very high boiling and could not be distilled through the column. On treatment with water a sample of this liquid gave a white solid which appeared to be n-hexylboronic acid.

This higher boiling residue was replaced in the above reaction flask and treated further with boron trifluoride. This time, however, the reaction flask was heated in an oil bath to 170° C. The lower boiling n-hexyldifluoroborine distilled out of the reaction flask as it was formed. When no more liquid distilled over at this temperature the boron trifluoride addition was stopped and the reaction flask was permitted to cool. The residual material in the reaction flask solidified.

The lower layer, a dark viscous material, was distilled through a 15-inch Vigreaux column. A large evolution of boron trifluoride was noted. About 2 ml. of a liquid boiling below 98° was collected. The head temperature then rapidly rose to 112° C. and slowly to 162° C. with a steady evolution of boron trifluoride. A very viscous distillate was obtained. The distillation of this material indicated that it was a mixture of boron trifluoride hydrate and boric oxide as described by McGrath, Stack, and McCusker, J. Am. Chem. Soc., 66, 1263 (1944).

The combined fractions of n-hexyldifluoroborine were redistilled through a Vigreaux column and the fraction 90–93° was collected. This fraction weighed 16.7 g. A small amount of higher boiling residue remained.

*Example IV*

Into a 125 ml. Claisen flask were placed 22.5 g. of crude phenylboronic acid prepared by the method of Khotinsky and Melamed, Ber. 42, 3090-6 (1909) and benzene. The Claisen flask was fitted with 10 mm. glass tubing which extended nearly to the bottom of the flask and with a thermometer using rubber stopper connections. The side arm of the flask was connected to a water cooled condenser which was further connected to a ground glass adapter having a side arm. Between the boron trichloride tank and the glass tubing were placed safety bottles containing benzene. The side arm of the adapter was connected to sulfuric acid safety bottles which were further connected to a receiver immersed in acetone-Dry Ice. The distillation receiver was immersed in an ice bath. The flask was heated with a free flame until all of the phenylboronic acid went into solution. The solution was maintained near boiling and boron trichloride was passed through for a period of 1½ hours. All of the boron trichloride was being absorbed as indicated by little bubbling in the safety bottles connected to the side arm of the adapter. If heating were discontinued and the solution allowed to cool slightly, a solid would come out of solution. A small amount of material distilled over during this time. After 1½ hours the bubbling of boron trichloride through the solution was discontinued and the material in the Claisen flask distilled. A solid came out of solution as a liquid (probably all benzene) distilled off at about 80°. After removal of all the solvent, the solid remaining in the flask was heated to a melt using a free flame and boron trichloride passed through the melt. A clear liquid distilled over at a temperature of 162–78°. At the end of the distillation a very hard mass formed in the Claisen flask. About 25 ml. of liquid were caught in the receiver. This material fumed profusely.

The benzene solution distilled off initially was redistilled through a modified Vigreaux column. The head temperature did not go over 80°. A solid came out of solution during distillation which melted on increased heating and then boiled. It turned black but did not distill over while using a free flame.

The material collected from the reaction of boron trichloride and the melt remaining after removal of the benzene solvent was distilled through a modified Vigreaux column under vacuum. The vacuum fluctuated greatly during the initial stages of distillation, but it finally settled down to a fairly constant value. This fluctuation was probably due to the very volatile boron trichloride present in solution. The head temperature registered 37° during the initial stages of distillation, but then it climbed quite rapidly to 90° at a pressure of 45 mm. Hg. The head temperature then gradually decreased to 87.5° at 39 mm. Hg. A clear liquid distilled off at these temperatures. A clear fraction was collected between 87.5° and 90° at pressures of 34–45 mm. Hg. The total volume of the fraction was approximately 9 ml. and it weighed approximately 11 g.

The clear fraction that was obtained was analyzed for chlorine. About .5 ml. of the liquid was quickly transferred to a tared weighing bottle with stopper and weighed. The material was poured into 50 ml. of water and a vigorous reaction occurred. The solution was titrated with standard base to a methyl orange end-point. % Chlorine; calc. for $C_6H_5BCl_2$, 44.65. Obs. 42.3.

*Example V*

A 500 ml., 3 neck, round bottom flask was fitted with an inlet tube which extended to the bottom of the flask, a mercury sealed stirrer, and an outlet tube. Boron trifluoride was passed through a Gilman bridge containing concentrated sulfuric acid and through the inlet tube. The exit gases flowed into an acetone-Dry Ice cooled trap and finally through a second Gilman bridge containing concentrated sulfuric acid.

Crude cyclohexyl boronic acid (29.5 g.; 0.23 mole) was placed in the reaction flask which had been previously flushed out with boron trifluoride. When boron trifluoride was passed into the reaction flask, the solid cyclohexyl boronic acid liquefied and separated into two layers with the libration of heat. The stirrer was started and the addition of boron trifluoride was continued until the absorption of boron trifluoride slowed down as indicated by the appearance of exit gases. The liquid in the reaction flask was then transferred into a 250 ml. separatory funnel and the two layers were separated.

The upper layer (18.3 g.) was placed in a small Vigreaux type distilling flask and distilled. The fraction boiling from 89–94° C. was collected (10.8 g.). A semi-solid higher boiling residue remained (7 g.). This was probably a mixture of unreacted anhydride and boron oxide. The distillate was redistilled through a 22 inch glass helix packed column of the total reflux-partial take off type and the fraction boiling at 94–5° C. was collected.

*Example VI*

Crude 2-amyl boronic acid (40 g.; 0.345 mole) was placed in a reaction flask which had been previously flushed out with boron trifluoride. Upon treatment with boron trifluoride the solid acid liquefied with the liberation of heat and two layers were formed in the usual manner. However, when the addition tube was removed from the reaction flask, at the mouth of the flask a green flame appeared. The flame was readily extinguished and the top was replaced.

The reaction mixture was carefully transferred under nitrogen into a 250 ml. separatory funnel and the two layers were separated. The upper layer weighed 22.5 g. This was transferred into a 50 ml. Vigreaux type distilling flask and was distilled in a nitrogen atmosphere. The fraction boiling at 53–7° C. was collected. This fraction weighed 12.3 g. A higher boiling residue remained in the distilling flask.

*Example VII*

Crude tert-amyl boronic acid (40 g.; 0.345 mole) was placed in a reaction flask which was previously flushed out with boron trifluoride. The reaction with boron trifluoride was normal. Heat was liberated and the solid acid liquefied and formed two liquid layers. When no more boron trifluoride was absorbed the mixture was transferred under nitrogen into a 250 ml. separatory funnel and the two layers were separated. The upper layer weighed 19.9 g. The upper layer was distilled through a 22 inch glass helix packed column of the total reflux-partial take off type. The fraction boiling between 45.9–46.2° C. was collected The high boiling residue which was probably unreacted anhydride was placed in a Vigreaux type distilling flask. Boron trifluoride was passed into the liquid while it was heated. The lower boiling tert-amyldifluoroborine was distilled from the reaction mixture as it was formed. The residue of boron oxide finally solidified. The product obtained in this step was added to the above fraction.

Various modifications can be made in the specific procedures described to provide other embodiments which fall within the scope of my invention. Thus, in place of boron trifluoride and boron trichloride there can be substituted boron tribromide. Also, other organoboronic and organoborinic acids can be substituted for those utilized in the specific examples, preferably having not more than eight carbon atoms in each organic group, for example, methylboronic acid, dimethylborinic acid, ethylboronic acid, diethylborinic acid, di-2-secondary amylborinic acid, n-octylboronic acid, di-n-octylborinic acid, 2-ethylhexylboronic acid, di-2-ethylhexylborinic acid, decylboronic acid, didecylborinic acid, dodecylboronic acid, didodecylborinic acid, cyclopentylboronic acid, dicyclopentylborinic acid, dicyclohexylborinic acid, the methylcyclopentylboronic acids, the dimethylcyclopentylborinic acids, diphenylborinic acid, p-tolylboronic acid, di-p-tolylborinic acid, the xylyl-boronic acids, the di-xylyl-borinic acids, p-ethylphenylboronic acid, di-p-ethylphenylborinic acid, naphthylboronic acid, dinaphthylborinic acid, and the like. The compounds of the formula $RBF_2$ where R is cyclohexyl radical or an alkyl radical having from four to six carbon atoms prepared as described above are new chemical compounds.

I claim:

1. A method for the preparation of a compound of the formula $R_nBX_{3-n}$ which comprises reacting a compound of the formula $R_nB(OH)_{3-n}$ with a compound of the formula $BX_3$, R being a substituent selected from the group consisting of saturated hydrocarbon, phenyl, lower alkyl phenyl and naphthyl radicals, X being selected from the group consisting of fluorine, chlorine and bromine and $n$ being an integer from 1 to 2, with the proviso that when R is phenyl, lower alkyl phenyl and naphthyl, X is selected from the group consisting of chlorine and bromine.

2. A method according to claim 1 in which R is a saturated hydrocarbon radical.

3. A method according to claim 1 in which X is fluorine.

4. A method according to claim 1 in which R is a saturated hydrocarbon radical, in which X is fluorine and in which $n$ is 1.

5. A method according to claim 4 in which R is n-amyl.

6. A method according to claim 4 in which R is n-butyl.

7. A method according to claim 4 in which R is n-hexyl.

8. A method according to claim 1 in which X is chlorine.

9. A method according to claim 1 in which R is phenyl, in which X is chlorine and in which $n$ is 1.

References Cited in the file of this patent
FOREIGN PATENTS 618,358    Great Britain _____ Feb. 21, 1949

OTHER REFERENCES

Burg: Jour. Amer. Chem. Soc., 62, pp. 2228–34 (1940).